United States Patent
Knoth et al.

(10) Patent No.: US 12,098,075 B2
(45) Date of Patent: Sep. 24, 2024

(54) METHOD FOR OBTAINING HEXACHLORODISILANE BY REACTING AT LEAST ONE PARTIALLY HYDROGENATED CHLORODISILANE ON A SOLID UNFUNCTIONALIZED ADSORBER

(71) Applicant: Wacker Chemie AG, Munich (DE)

(72) Inventors: Jens Felix Knoth, Marktl (DE); Uwe Pätzold, Burghausen (DE); Monika Straßer, Burghausen (DE)

(73) Assignee: Wacker Chemie AG, Munich (DE)

( * ) Notice: Subject to any disclaimer, the term of this patent is extended or adjusted under 35 U.S.C. 154(b) by 467 days.

(21) Appl. No.: 17/620,046

(22) PCT Filed: Feb. 20, 2020

(86) PCT No.: PCT/EP2020/054490
§ 371 (c)(1),
(2) Date: Dec. 16, 2021

(87) PCT Pub. No.: WO2021/164876
PCT Pub. Date: Aug. 26, 2021

(65) Prior Publication Data
US 2022/0356064 A1  Nov. 10, 2022

(51) Int. Cl.
*C01B 33/107* (2006.01)
*B01J 20/26* (2006.01)
*C01B 33/03* (2006.01)

(52) U.S. Cl.
CPC ......... *C01B 33/1071* (2013.01); *B01J 20/261* (2013.01); *C01B 33/03* (2013.01); *C01B 33/107* (2013.01)

(58) Field of Classification Search
CPC . B01D 15/08; B01J 20/10; B01J 20/16; B01J 20/26; B01J 20/261; C01B 33/03; C01B 33/107; C01B 33/1071; C01B 33/10784; C07F 7/12; C07F 7/20
See application file for complete search history.

(56) References Cited

U.S. PATENT DOCUMENTS 7,691,357 B2   4/2010  Shimizu et al.

FOREIGN PATENT DOCUMENTS

| CA | 1162028 A | 2/1984 | |
| CN | 106966397 A | 7/2017 | |
| DE | 3503262 A1 | 8/1986 | |
| EP | 1264798 B1 | 8/2016 | |
| JP | S60145908 A | 8/1985 | |
| JP | 2006176357 A | * 7/2006 | |
| WO | WO-2016091240 A1 | * 6/2016 | .......... B01J 31/0237 |

OTHER PUBLICATIONS

Noboru et al. JP2006176357A English Translation (Year: 2006).*
Schley et al. WO2016091240A1 English Translation (Year: 2016).*
Ye Wan, Xiong Zhao, Dazhou Yan, Yu Zhao, Shuhu Guo, Lei Wang, Dian Yang: "The Research about Preparation of High Purity Hexachlorodisilane".

* cited by examiner

*Primary Examiner* — Samir Shah
*Assistant Examiner* — Jordan W Taylor

(57) ABSTRACT

A process for obtaining hexachlorodisilane and uses for the same. The process includes contacting at least one partially hydrogenated chlorodisilane of general formula $H_xSi_2Cl_{(6-x)}$ where x is from 1 to 5 in the liquid state with a solid non-functionalized adsorber material that is selected from the group comprising silicates, aluminosilicates, organic polymer and/or combinations thereof. The process also includes optionally separating the hexachlorodisilane and/or optionally separating the adsorber material.

15 Claims, No Drawings

US 12,098,075 B2

METHOD FOR OBTAINING HEXACHLORODISILANE BY REACTING AT LEAST ONE PARTIALLY HYDROGENATED CHLORODISILANE ON A SOLID UNFUNCTIONALIZED ADSORBER

CROSS-REFERENCE TO RELATED APPLICATIONS

This application is a U.S. National Phase application of PCT Application No. PCT/EP2020/054490 filed on Feb. 20, 2020 the disclosure of which is incorporated by reference herein in its entirety.

The invention relates to a process for obtaining hexachlorodisilane, wherein at least one partially hydrogenated chlorodisilane is contacted with a solid non-functionalized adsorber material and the hexachlorodisilane and/or the adsorber material are then optionally separated.

Hexachlorodisilane (HCDS) is an important starting material in the field of microelectronics as a precursor compound for vapor deposition of high-purity silicon nitride, silicon oxide and silicon carbide layers. It is additionally employed in low-temperature epitaxy for deposition of epitaxial silicon layers.

For use in microelectronics even the smallest traces of impurities, in particular dopants such as boron, phosphorus, arsenic and antimony, generate considerable problems. If the HCDS is contaminated with dopants these can lead to undesired doping effects and reduce the service life of electrical components through migration processes.

JPS60145908A discloses that HCDS may be obtained by reaction of metallurgical silicon and chlorine. However, the impurities present in the metallurgical silicon result in formation of byproducts such as $AlCl_3$ and $TiCl_4$ which impede distillative purification due to the similarity of their boiling points to that of HCDS.

By contrast, one option for economic production of high-purity HCDS is obtaining it from the offgases from deposition of polycrystalline silicon (polysilicon) by the Siemens process for example. Condensation of the offgases affords HCDS in admixture with further chloromonosilanes and chlorodisilanes having a lower concentration of impurities. Separation of partially hydrogenated disilanes from HCDS is technically complex on account of the very similar boiling points.

EP 1 264 798 A1 discloses initially separating low-boiling components (for example trichlorosilane (TCS)) from an offgas stream from polysilicon production. Silicon tetrachloride is subsequently removed by distillation. The obtained fraction is then subjected to renewed distillative purification, or chlorine is added to chlorinate partially hydrogenated disilanes (for example tetrachlorodisilane), before HCDS is separated from higher-boiling compounds (for example octachlorotrisilane) by distillation.

U.S. Pat. No. 7,691,357 B2 describes chlorination of a chlorosilane mixture from the offgas stream from polysilicon production. However, this does not just chlorinate the hydrogen-containing disilanes but also results in cleavage of disilanes, inter alia also of HCDS. As well as the yield loss of HCDS resulting from cleavage, the chlorine addition can also result in introduction of impurities. Furthermore any chlorine-containing offgas present requires complex cleaning and the use of chlorine generally increases apparatus cost and complexity.

JP 2006176357 A2 discloses the use of activated carbon at elevated temperature and elevated pressure to partially convert tetrachlorodisilane and pentachlorodisilane into HCDS from a mixture of partially hydrogenated disilanes. This does enhance the HCDS yield but the product still contains considerable amounts of partially hydrogenated disilanes after conversion and these therefore require costly and complex distillative removal.

DE 3503262 discloses the use of aprotic organonitrogen and organophosphorus compounds at temperatures of 20° C. to 160° C. to effect cleavage of disilane mixtures. Decomposition of pentachlorodisilane may proceed more rapidly than that of HCDS and HCDS may be obtained substantially undecomposed through choice of suitable process parameters. The organonitrogen and organophosphorus compounds are introduced into the product mixture and can represent a contamination source. Especially the presence of the phosphorus compounds may be critical due to the effect of phosphorus as a dopant. The described process also forms no additional HCDS.

WO 2016/091240 A1 discloses using catalytically active organonitrogen and organophosphorus compounds to obtain HCDS from process offgas streams from polysilicon production. However, in addition to the conversion of partially hydrogenated disilanes into HCDS, significant amounts of high boilers may also occur. This may in particular be attributable to disproportionation of the disilanes since the catalysts can act as disproportionation catalysts (cf. CA1162028A). Here too, the use of the organonitrogen and organophosphorus compounds can result in contamination of the target product. The yields of HCDS are also rather low.

The present invention accordingly has for its object to provide an efficient process for producing HCDS suitable for use in the electronics industry which avoids the disadvantages known from the prior art.

This object is achieved by a process for obtaining HCDS which comprises the steps of:
  a) contacting at least one partially hydrogenated chlorodisilane of general formula $H_xSi_2Cl_{(6-x)}$ where x=1 to 5 in the liquid state with a solid non-functionalized adsorber material selected from the group comprising silicates, aluminosilicates (for example zeolites, molecular sieves), organic polymer and combinations thereof,
  b) optionally separating the hexachlorodisilane (for example by distillation) and/or optionally separating the adsorber material (for example by filtration).

It is preferable when a mixture comprising the at least one partially hydrogenated chlorodisilane is concerned in step a).

It has surprisingly been found that partially hydrogenated disilanes may be selectively converted into HCDS by contacting with the non-functionalized adsorber material. The presence of additional compounds such as organonitrogen and/or organophosphorus compounds or else metal- and/or metalloid-containing compounds is not necessary.

The term "non-functionalized" is in particular to be understood as meaning that prior to the contacting the adsorber material bears no additional chemically bound functional groups, in particular no nitrogen- and phosphorus-containing groups. If silicates and/or aluminosilicates are concerned, their structural units (Si—O—Si/Al—O and Si—OH/Al—OH) are not to be understood as constituting functional groups. If the adsorber material is an organic polymer it may be preferable for this to be exclusively constructed from carbon and hydrogen atoms or at least to comprise no nitrogen and phosphorus atoms. "Non-functionalized" is further to be understood as meaning that the adsorber material is not impregnated prior to the contacting, especially not with catalytically active substances and/or metals/metalloids In contrast to the heterogeneous and homogeneous catalysts known from the prior art (cf. WO 2016/091240 A1) the process according to the invention can generate an additional yield of HCDS of more than 30% by weight, preferably of more than 40% by weight, particularly preferably of more than 50% by weight, in particular of more than 70% by weight.

The pressure and the temperature of the process, in particular of step a), are chosen such that the mixture is in the liquid state of matter upon contacting with the adsorber material. It is preferable when step a) is performed in a pressure range of 0.1 to 2.1 MPa, particularly preferably 0.11 to 1.1 MPa, in particular 0.125 to 0.6 MPa. The temperature is preferably at −50° C. to 300° C., particularly preferably at −10° C. to 200° C., particularly preferably at 0° C. to 180° C. Step a) generally already proceeds optimally at a temperature of 20° C. and a pressure of 0.1 MPa. The reported pressures relate to absolute pressure.

After step a) the proportion of unconverted partially hydrogenated chlorodisilane may particularly advantageously be less than 10%, preferably less than 6%, particularly preferably less than 3%, based on the amount thereof before step a) (starting content). This proportion may in some cases also be less than 1%, thus corresponding to complete or virtually complete conversion (>99%).

The partially hydrogenated chlorodisilane is in particular pentachlorodisilane. The proportion of unconverted pentachlorodisilane based on the starting content thereof may after step a) be less than 5%, preferably less than 2%, particularly preferably less than 0.1%. In particular, pentachlorodisilane is no longer observed after step a) (100% conversion of pentachlorodisilane).

The organic polymer is preferably selected from the group comprising polystyrene, polyvinylbenzene, styrene-divinylbenzene copolymer and combinations thereof. Polyethylene may also be concerned, optionally in combination with the abovementioned polymers.

The non-functionalized adsorber material preferably comprises a styrene-divinylbenzene copolymer. The adsorber material is particularly preferably a styrene-divinylbenzene copolymer.

The adsorber material may also be activated carbon.

The adsorber material may be in the form of particles and/or fibers. It is preferably in particulate form and preferably has a surface area of 200 to 2000 m²/g, particularly preferably 400 to 1000 m²/g, in particular 500 to 850 m²/g. Surface area measurement may be carried out for example by BET measurement (DIN ISO 9277).

Said material may be in the form of particles having an average particle size (=average particle diameter) of 0.149 to 4.760 mm (4 to 100 mesh), preferably 0.177 to 2.0 mm (10 to 80 mesh), particularly preferably 0.210 to 1.410 mm (14 to 70 mesh), for example. The determination of average particle size may be carried out by dynamic image analysis (ISO 13322-2), laser diffraction or sieving.

The adsorber material may further be porous. Macroporous particles may especially be concerned. The adsorber material preferably has an average pore diameter of 1 to 900*10⁻¹⁰ m, preferably of 2 to 450*10⁻¹⁰ m, particularly preferably of 4 to 200*10⁻¹⁰ m, in particular of 5 to 125*10⁻¹⁰.

The adsorber material may exhibit swelling behavior as a result of the contacting with hexachlorodisilane or with a mixture containing same. However, the volume increase (swelling) of a particulate adsorber material is preferably ≤7%, particularly preferably ≤6%, in particular ≤5%.

The process according to the invention is preferably performed under anhydrous or at least substantially anhydrous conditions. "Substantially anhydrous" is to be understood as meaning that traces of water may be present in the adsorber material. Typically less than 5% by weight, preferably less than 3% by weight, particularly preferably less than 2% by weight, are present.

It is in principle immaterial to operation for the adsorber material to comprise the recited traces of water. To avoid losses through chlorodisilane hydrolysis, the water content is normally kept as low as possible. Thus, in principle no moisture is additionally supplied. It is in principle not necessary to subject the adsorber material to a drying step before step a) since the recited water proportion is consistently not exceeded for typical adsorber materials. However, it may in some cases nevertheless be preferred to perform a drying step before step a).

The employed chlorodisilanes are generally anhydrous, irrespective of whether they are present as a constituent of a mixture or singly.

In a preferred embodiment, in step a) the adsorber material is in the form of a fixed bed in one or more containers arranged in series or in parallel which are continuously traversed by the partially hydrogenated chlorodisilane/a mixture containing same. The adsorber material present as a fixed bed is preferably retained using a sieve or a perforated screen. This allows omission of an additional separation step (step b).

The hydrodynamic residence time z of the partially hydrogenated chlorodisilane or of a mixture containing same in a reaction volume filled with the adsorber material (this may be one or more containers) is preferably 1 min to 1800 min, particularly preferably 10 to 240 min, in particular 15 to 60 min. τ is calculated according to $$\tau = \frac{V_R}{\dot{V}},$$

wherein $V_R$: reaction volume: volume filled with the adsorber material [m³], $\dot{V}$: volume flow of the chlorodisilane [m³/min].

It is in principle also possible for the partially hydrogenated chlorodisilane or a mixture containing same to remain in contact with the adsorber material in the form of a fixed bed or a fluidized bed for a predetermined period of time and then be separated according to step b) (discontinuous procedure). In this case the residence time is preferably less than 24 h, particularly preferably less than 4 h, in particular less than 1 h. In the simplest case the separating may be effected by discharging from a container, wherein the solid adsorber material is retained by a sieve or a perforated screen.

In some cases a partial decomposition of the target product may occur at a longer residence time.

The separating of the adsorber material in step b) is preferably effected by solid-liquid separation, in particular by filtration.

In a preferred embodiment the at least one partially hydrogenated chlorodisilane is a constituent of a mixture containing at least one chlorosilane of general formula $H_{(4-x)}SiCl_x$ where x=1 to 4.

The mixture may in particular be an offgas stream from the production of polysilicon by hydrogen reduction of chlorodisilane (for example Siemens process).

The mixture may further be an offgas stream from the production of tetrachlorosilane by hydrogenation (for example high temperature conversion).

In both processes a higher-hydrogenated silane selected from the group comprising silane, monochlorosilane and dichlorosilane may be added to increase the proportion of HCDS in the offgas stream.

Since the offgases are generally generated in gaseous form they are preferably liquefied by condensation before step a).

The mixture especially contains chlorosilanes and chlorodisilanes selected from the group comprising dichlorosilane, trichlorosilane, tetrachlorosilane, dichlorodisilane, trichlorodisilane, tetrachlorodisilane, pentachlorodisilane and HCDS.

It may be provided that low-boiling chlorosilanes present in the mixture are separated, in particular by distillation, before the contacting with the adsorber material. "Low-boiling chlorosilanes" is to be understood as meaning chlorosilanes having a lower boiling point than silicon tetrachloride (57.65° C. at standard pressure). This separation step may optionally also be followed by a filtration.

If the mixture provided for step a) is an offgas stream from the production of polysilicon the deposition of the polysilicon may be performed in such a way that the content of HCDS in the condensed offgas stream is elevated. This may be achieved for example by addition of additional amounts of higher-hydrogenated chlorosilanes of formula $H_{(4-x)}SiCl_x$ where x=2 to 4 (for example dichlorosilane) during deposition. However, this particularly economic procedure has the general disadvantage that partially hydrogenated disilanes are also formed to a greater extent. However, these may now be efficiently converted into HCDS by the process according to the invention. Without the use of the process according to the invention the partially hydrogenated silanes would generate elevated separation cost and complexity and increased amounts of waste.

After step a) the mixture has an elevated content of HCDS and the proportion of partially hydrogenated disilanes is markedly reduced. After step a), the proportion Y of partially hydrogenated disilanes (sum of: pentachlorodisilane, tetrachlorodisilane; trichlorodisilane; dichlorodisilane) based on the proportion of HCDS is given by:

$$Y = X_{part}/X_{HCDS}$$

where:
$X_{part}$=mass fraction of partially hydrogenated disilanes in % by weight
$X_{HCDS}$=mass fraction of HCDS in % by weight The process according to the invention especially makes it possible to greatly reduce the value for Y. Accordingly, the ratio Z of the value for Y after step a) $Y_1$ to the value for Y before step a) $Y_0$ is preferably less than 10, particularly preferably less than 6, in particular less than 3.

$$Z = Y_1/Y_0$$

where
$Y_1$=proportion of partially hydrogenated disilanes based on HCDS after step a)
$Y_0$=proportion of partially hydrogenated disilanes based on HCDS before step a)

This is achieved by a conversion of pentachlorodisilane, tetrachlorodisilane, trichlorodisilane and dichlorodisilane of >85% in each case, preferably of >95% in each case, particularly preferably of >97% in each case, in particular of >99% in each case.

Conversion is calculated according to:

$$U = 1 - c/c_0$$

where:
U=conversion of the respective component
c=concentration of the respective component after step a) in the mixture in % by weight
$c_0$=concentration of the respective component before step a) in the mixture in % by weight The pentachlorodisilane which is generally difficult to separate may especially be reduced to a proportion (based on HCDS) of <1.0%, preferably <0.1%, particularly preferably 0.01%.

In step b) chlorosilanes of general formula $H_{(4-x)}SiCl_x$ where x=1-4, in particular where x=1-2, may be separated as distillate from the mixture obtained after step a). HCDS is obtainable from the remaining high boiler fraction without any need for a further distillation for separating chlorodisilanes of general formula $H_{(x)}Si_2Cl_{6-x}$ where x=1-4. This last distillation step may especially be omitted when the mixture contains no higher-boiling compounds (i.e. having a boiling point above that of HCDS, for example Si (for example dust) or $Si_3Cl_8$) before step a) since these are in principle not generated in step a) as byproduct.

It is preferable when the mixture employed in step a) has a content of impurities (metals and dopants such as phosphorus for example) of not more than 100 ppbw in each case, particularly preferably of not more than 10 ppbw in each case, especially preferably of not more than 5 ppbw in each case. This makes it possible to omit further purification to separate these impurities. The content of nitrogen is typically also within the recited limits. The use of the non-functionalized adsorber material ensures that the fundamentally high purity of the mixture is retained.

It is preferable when the concentration of partially hydrogenated chlorodisilanes and/or of HCDS is determined before step a) and/or after step a) and optionally after step b). This makes it possible to adapt the mass flow of the mixture in the case of continuous traversal of the adsorber material as a fixed bed for example. The concentration may be determined by gas chromatography with a thermal conductivity detector (GC-TCD), with sampling preferably being carried out continuously.

It may be provided to perform step a) two or more times in succession.

A further aspect of the invention relates to the use of the adsorber material to obtain HCDS, in particular according to the described process. In terms of the further configuration of the adsorber material reference may be made to the description hereinabove.

EXAMPLE 1

3.75 g of a mixture containing chlorosilanes of general formula $H_{(4-x)}SiCl_x$ where x=1 to 4, partially hydrogenated disilanes of general formula $H_xSi_2Cl_{(6-x)}$ where x=1 to 5 and HCDS were admixed with 0.15 g of the non-functionalized adsorber material. After a residence time of 24 h at 22° C. the adsorber material was separated by filtration and the obtained mixture analyzed by gas chromatography with a thermal conductivity detector (GC-TCD). The employed adsorber material was a styrene-divinylbenzene copolymer (for example Amberlite XAD-4). The particle size was 0.25-0.84 mm (20-60 mesh), the surface area was 750 m²/g and the non-functionalized adsorber material had an average pore diameter of 50*10⁻¹⁰ m.

TABLE 1

| Component | before step a) | after step b) |
|---|---|---|
| Dichlorosilane/% by wt. | 0.0000 | 0.0577 |
| Trichlorosilane/% by wt. | 0.0010 | 0.7589 |
| Tetrachlorosilane/% by wt. | 98.5769 | 98.1206 |
| Dichlorodisilane/% by wt. | 0.0248 | 0.0026 |
| Trichlorodisilane/% by wt. | 0.0223 | 0.0071 |
| Tetrachlorodisilane/% by wt. | 0.2141 | 0.0247 |
| Pentachlorodisilane/% by wt. | 0.5874 | 0.0000 |
| HCDS/% by wt. | 0.5735 | 0.9673 |

As is apparent from table 1 an elevated proportion of HCDS was found after step b) (169% of the HCDS proportion in the employed mixture). The proportion of partially hydrogenated chlorodisilanes based on HCDS was reduced to 2.4% of the initial value (in the employed mixture). This example even achieved complete conversion of the pentachlorodisilane within the limits of detection.

EXAMPLE 2

7.4 g of a mixture containing chlorosilanes of general formula $H_{(4-x)}SiCl_x$ where x=1 to 4, partially hydrogenated disilanes of general formula $H_xSi_2Cl_{(6-x)}$ where x=1 to 5 and HCDS were admixed with 0.30 g of the non-functionalized adsorber material. After a residence time of 60 min at 22° C. the adsorber material was separated by filtration and the obtained mixture analyzed as in example 1. The adsorber material employed was that from example 1.

TABLE 2

| Component | before step a) | after step b) |
|---|---|---|
| Dichlorosilane/% by wt. | 0.0000 | 0.0516 |
| Trichlorosilane/% by wt. | 0.0033 | 0.5532 |
| Tetrachlorosilane/% by wt. | 98.6801 | 98.2499 |
| Dichlorodisilane/% by wt. | 0.0215 | 0.0033 |
| Trichlorodisilane/% by wt. | 0.0165 | 0.0008 |
| Tetrachlorodisilane/% by wt. | 0.1837 | 0.0236 |
| Pentachlorodisilane/% by wt. | 0.5350 | 0.0305 |
| HCDS/% by wt. | 0.5599 | 1.0481 |

Even at a residence time of 60 min a markedly elevated proportion of HCDS was found, as is apparent from table 2 (187% of the HCDS proportion in the employed mixture). At this residence time the conversion of the partially hydrogenated chlorodisilanes is slightly lower. The proportion of partially hydrogenated chlorodisilanes based on HCDS was reduced to 4.1% of the initial value (in the employed mixture). A pentachlorodisilane conversion of 94.3% was achieved.

EXAMPLE 3

3.75 g of a mixture containing chlorosilanes of general formula $H_{(4-x)}SiCl_x$ where x=1 to 4, partially hydrogenated disilanes of general formula $H_xSi_2Cl_{(6-x)}$ where x=1 to 5 and HCDS were admixed with 0.15 g of the adsorber material. After a residence time of 27 h at 22° C. the adsorber material was separated by filtration and the obtained mixture analyzed as in example 1. The employed adsorber material was a styrene-divinylbenzene copolymer (for example Amberlite XAD-1180). The particle size was 0.25-0.84 mm (20-60 mesh), the surface area was 600 m²/g and the adsorber material had an average pore diameter of 300*10⁻¹⁰ m.

TABLE 3

| Component | before step a) | after step b) |
|---|---|---|
| Dichlorosilane/% by wt. | 0.0000 | 0.0422 |
| Trichlorosilane/% by wt. | 0.0025 | 0.6958 |
| Tetrachlorosilane/% by wt. | 98.7228 | 98.3846 |
| Dichlorodisilane/% by wt. | 0.0224 | 0.0031 |
| Trichlorodisilane/% by wt. | 0.0088 | 0.0066 |
| Tetrachlorodisilane/% by wt. | 0.1711 | 0.0384 |
| Pentachlorodisilane/% by wt. | 0.5252 | 0.0004 |
| HCDS/% by wt. | 0.5472 | 0.7410 |

An elevated proportion of HCDS was found after step b) (table 3; 135% of the HCDS proportion in the employed mixture). The proportion of partially hydrogenated chlorodisilanes based on HCDS was reduced to 4.9% of the initial value (in the employed mixture). A pentachlorodisilane conversion of over 99.9% within the limits of detection was achieved.

COMPARATIVE EXAMPLE 4

The experimental setup was analogous to that of example 1 but an amino-functionalized polymer resin (Amberlyst 21 A) adsorber material according to WO 2016/091240 A1 was employed.

TABLE 4

| Component | before step a) | after step b) |
|---|---|---|
| Dichlorosilane/% by wt. | 0.0000 | 0.0120 |
| Trichlorosilane/% by wt. | 0.0025 | 0.9794 |
| Tetrachlorosilane/% by wt. | 98.7228 | 98.6081 |
| Dichlorodisilane/% by wt. | 0.0224 | 0.0000 |
| Trichlorodisilane/% by wt. | 0.0088 | 0.0000 |
| Tetrachlorodisilane/% by wt. | 0.1711 | 0.0243 |
| Pentachlorodisilane/% by wt. | 0.5252 | 0.0015 |
| HCDS/% by wt. | 0.5472 | 0.2123 |

While the proportion of partially hydrogenated chlorodisilanes based on the HCDS was reduced to 9.2% of the initial value, this reduction was markedly smaller than that achieved with the process according to the invention (cf table 4). In addition, the proportion of HCDS in the mixture fell to 39% of the proportion in the employed mixture.

COMPARATIVE EXAMPLE 5

The experimental setup was analogous to that of example 3 but an N-functionalized polymer resin (Seplite LSC 794) adsorber material according to WO 2016/091240 A1 was employed.

TABLE 5

| Component | before step a) | after step b) |
|---|---|---|
| Dichlorosilane/% by wt. | 0.0000 | 0.0021 |
| Trichlorosilane/% by wt. | 0.0025 | 0.0480 |
| Tetrachlorosilane/% by wt. | 98.7228 | 98.9191 |
| Dichlorodisilane/% by wt. | 0.0224 | 0.0216 |
| Trichlorodisilane/% by wt. | 0.0088 | 0.0025 |
| Tetrachlorodisilane/% by wt. | 0.1711 | 0.0932 |
| Pentachlorodisilane/% by wt. | 0.5252 | 0.3938 |
| HCDS/% by wt. | 0.5472 | 0.5123 |

An altogether low reactivity is apparent from table 5. A pentachlorodisilane conversion of only 25.0% was achieved. The HCDS yield was also reduced (94% of the HCDS proportion in the employed mixture).

COMPARATIVE EXAMPLE 6

The experimental setup was analogous to that of example 2 but an amino-functionalized polymer resin (Amberlyst 21 A) according to WO 2016/091240 A1 was employed as the adsorber material.

TABLE 6

| Component | before step a) | after step b) |
|---|---|---|
| Dichlorosilane/% by wt. | 0.0000 | 0.0198 |
| Trichlorosilane/% by wt. | 0.0033 | 0.6114 |
| Tetrachlorosilane/% by wt. | 98.6801 | 98.5583 |
| Dichlorodisilane/% by wt. | 0.0215 | 0.0046 |
| Trichlorodisilane/% by wt. | 0.0165 | 0.0022 |
| Tetrachlorodisilane/% by wt. | 0.1837 | 0.0474 |
| Pentachlorodisilane/% by wt. | 0.5350 | 0.0902 |
| HCDS/% by wt. | 0.5599 | 0.6243 |

As shown in table 6 a slightly elevated proportion of HCDS was found at a residence time of 60 min (112% of the HCDS proportion in the employed mixture). At this residence time the conversion of the partially hydrogenated chlorodisilane is lower. The proportion of the partially hydrogenated chlorodisilanes based on HCDS was reduced to 17.1% of the initial value (in the employed mixture). A pentachlorodisilane conversion of 83.1% was achieved. It is clearly apparent that the comparative example only affords much lower yields of HCDS and at economically important short residence times the conversion of the partially hydrogenated disilanes is markedly lower than in the process according to the invention.

The invention claimed is:

1. A process for obtaining hexachlorodisilane, comprising:
   a) contacting at least one partially hydrogenated chlorodisilane of general formula $H_xSi_2Cl_{(6-x)}$ wherein x is selected from 1 to 5 and wherein the at least one partially hydrogenated chlorodisilane is in the liquid state, with a solid, non-functionalized adsorber material selected selected from the group consisting of silicates, aluminosilicates, organic polymer and combinations thereof; and
   b) optionally separating the hexachlorodisilane and/or optionally separating the adsorber material.

2. The process of claim 1, wherein the partially hydrogenated chlorodisilane is pentachlorodisilane.

3. The process of claim 1, wherein the organic polymer is selected from the group consisting of polystyrene, polydivinylbenzene, styrene-divinylbenzene copolymer and combinations thereof.

4. The process of claim 1, wherein the non-functionalized adsorber material is a styrene-divinylbenzene copolymer.

5. The process of claim 1, wherein the non-functionalized adsorber material has an average particle size of 0.149 to 4.760 mm.

6. The process of claim 1, wherein the non-functionalized adsorber material has a surface area of 200 to 2000 m2/g.

7. The process of claim 1, wherein the non-functionalized adsorber material has an average pore diameter of 1 to 900*10^-10 m.

8. The process of claim 1, wherein prior to contacting the non-functionalized adsorber material with the at least one partially hydrogenated chlorodisilane, the non-functionalized adsorber material contains a proportion of water of less than 5% by weight.

9. The process of claim 1, wherein the at least one partially hydrogenated chlorodisilane is a constituent of a mixture containing at least one chlorosilane of general formula $H_{(4-x)}SiCl_x$ wherein x is from 1 to 4.

10. The process of claim 9, wherein the mixture is an offgas stream from the production of polycrystalline silicon by hydrogen reduction of chlorosilane.

11. The process of claim 9, wherein the mixture is an offgas stream from the production of tetrachlorosilane by hydrogenation.

12. The process of claim 9, wherein low-boiling chlorosilanes present in the mixture are separated before the contacting with the non-functionalized adsorber material.

13. The process of claim 1, wherein after step a) the proportion of unconverted partially hydrogenated chlorodisilane is less than 10% based on the respective starting content of the chlorodisilane.

14. The process of claim 2, wherein the proportion of unconverted pentachlorodisilane is less than 5% by weight based on the starting content thereof.

15. A process of using a solid non-functionalized adsorber material selected from the group consisting of silicates, aluminosilicates, organic polymer and combinations thereof for obtaining hexachlorodisilane by contacting the adsorber material with at least one partially hydrogenated chlorodisilane of general formula $H_xSi_2Cl_{(6-x)}$ wherein x is from 1 to 5 in the liquid state.

* * * * *